(No Model.) 3 Sheets—Sheet 1.
F. G. McCLELLAN.
FARM VEHICLE.
No. 419,280. Patented Jan. 14, 1890.
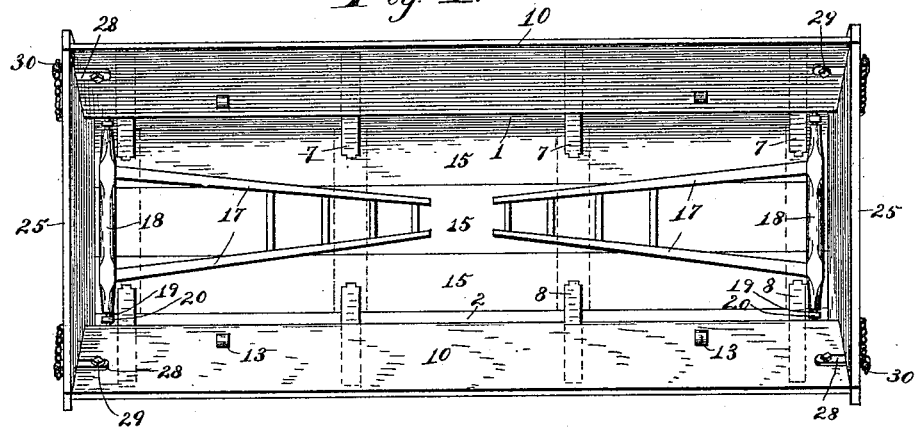
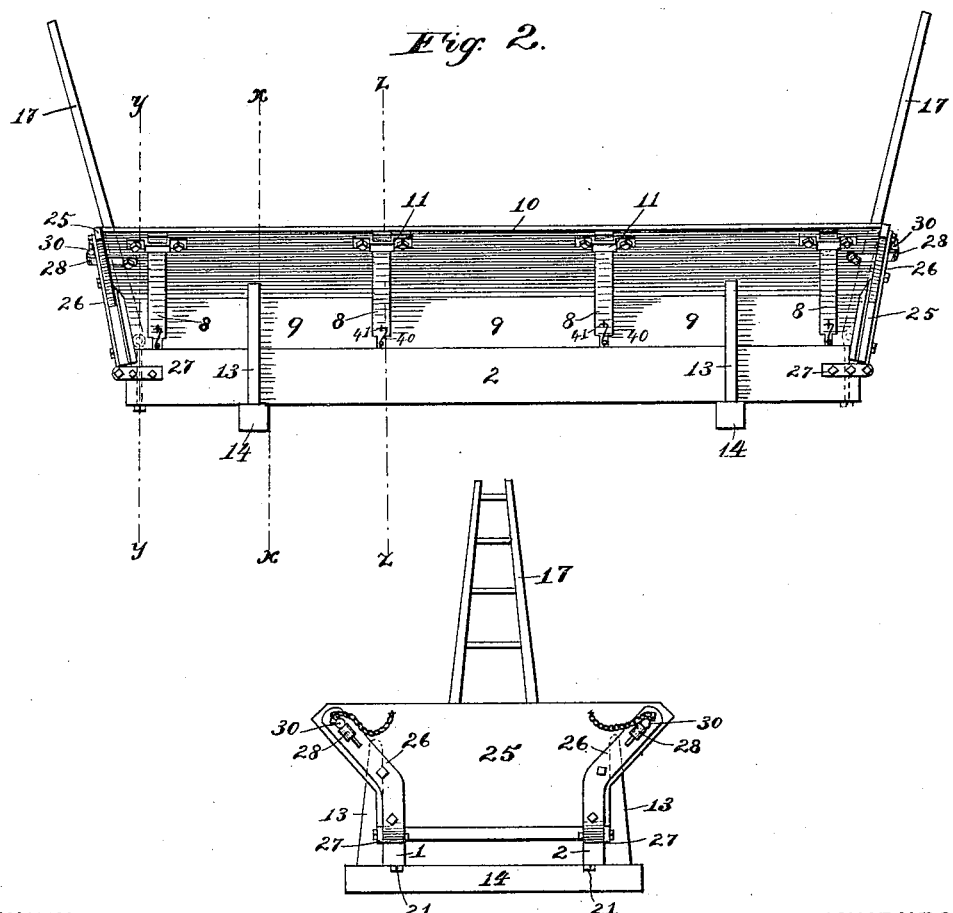
WITNESSES: INVENTOR (No Model.) 3 Sheets—Sheet 2.
F. G. McCLELLAN.
FARM VEHICLE.
No. 419,280. Patented Jan. 14, 1890.
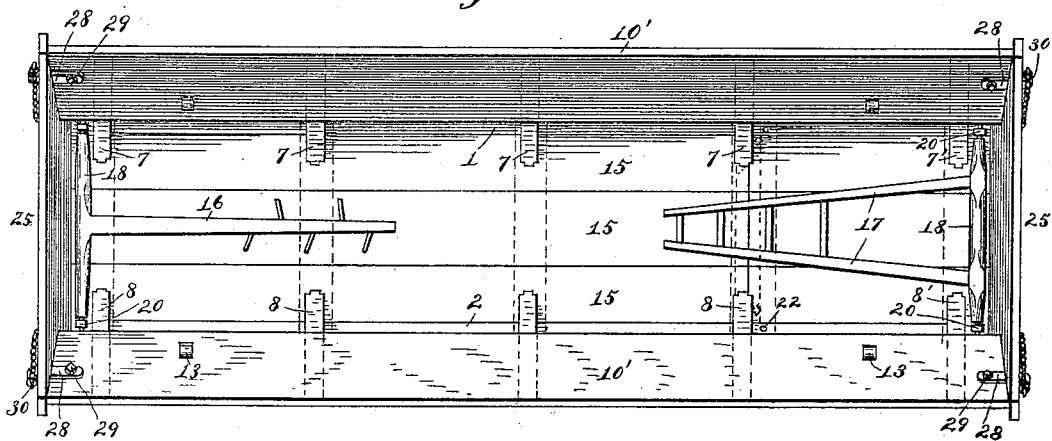
Fig. 4.
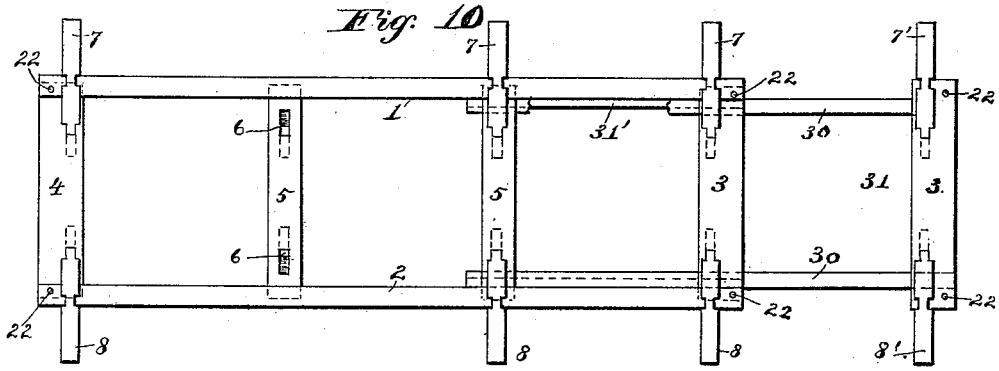
Fig. 10.
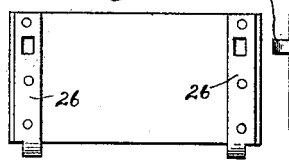
Fig. 12.
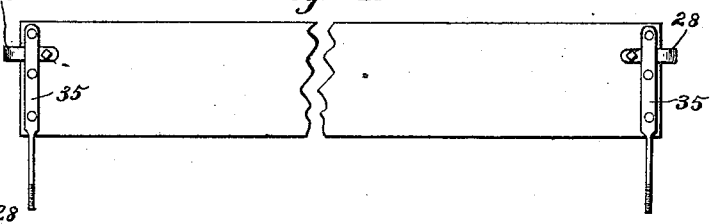
Fig. 11.
Fig. 14. Fig. 13.
WITNESSES:
Percy C. Bowen
H. F. Bernhard
INVENTOR
Felix G. McClellan
By Edson Bros.
Attorneys (No Model.) 3 Sheets—Sheet 3.

F. G. McCLELLAN.
FARM VEHICLE.

No. 419,280. Patented Jan. 14, 1890.

WITNESSES:
Percy C. Bowen
H. Bernhard

INVENTOR
Felix G. McClellan
By Edson Bros.
Attorneys.

N. PETERS, Photo-Lithographer, Washington, D. C.

UNITED STATES PATENT OFFICE.

FELIX G. McCLELLAN, OF CARROTHERS, OHIO.

FARM-VEHICLE.

SPECIFICATION forming part of Letters Patent No. 419,280, dated January 14, 1890.

Application filed May 18, 1889. Serial No. 311,243. (No model.)

*To all whom it may concern:*

Be it known that I, FELIX G. MCCLELLAN, a citizen of the United States, residing at Carrothers, in the county of Seneca and State of Ohio, have invented certain new and useful Improvements in Farm-Vehicles; and I do hereby declare the following to be a full, clear, and exact description of the invention, such as will enable others skilled in the art to which it appertains to make and use the same.

My invention relates to improvements upon the farm wagon or vehicle shown in a prior patent issued to me April 19, 1870, and numbered 102,023; and it consists of the peculiar construction, arrangement, and adaptation of parts, as will be hereinafter fully described, and particularly pointed out in the claims.

In my prior patent I employ a central removable bottom board having a slot at one end and lateral recesses in the edges thereof at its opposite end, through which are passed a rack and ladder, respectively, that are carried on rollers arranged and journaled below said bottom board; but in my present invention I obviate slotting or recessing this bottom board and arrange the pivot-bars of said rack and ladder above the bottom board and journal the same in eyebolts which are passed through the bottom and longitudinal sills of the wagon, whereby the bolts can be easily detached to permit of the removal of the ladder and rack when it is desired to use the vehicle for other purposes than hauling hay. I also aim to provide a vehicle which can be lengthened or shortened by the addition or removal of a few parts to adapt the vehicle to the different uses that may arise on a farm, and also to improve the parts in minor details with a view to promoting simplicity and durability of construction, efficiency in service, and to cheapen the cost of manufacturing the same.

To enable others to understand my invention, I will now proceed to describe the same in connection with the accompanying drawings, in which—

Figure 5:
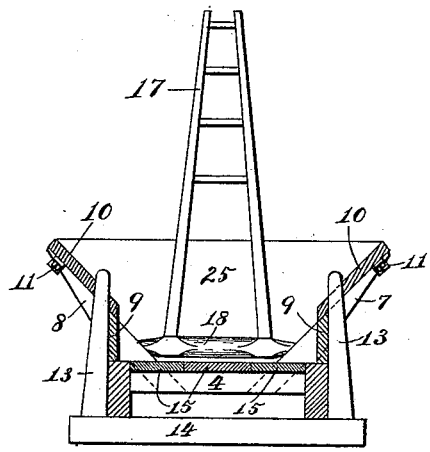
Figure 6:
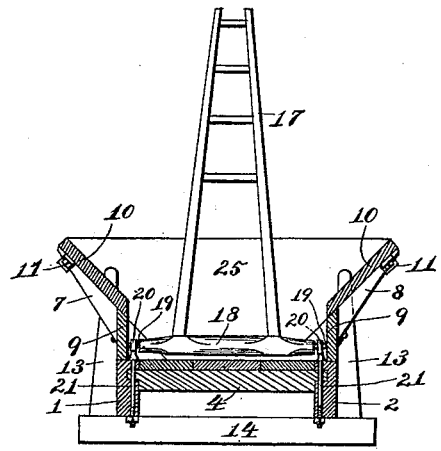
Figure 7:
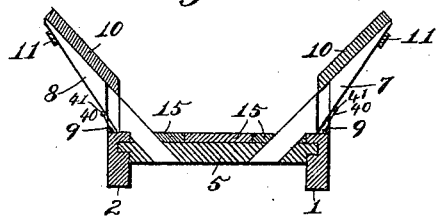
Figure 8:
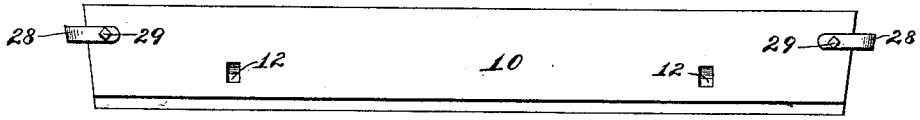
Figure 9:
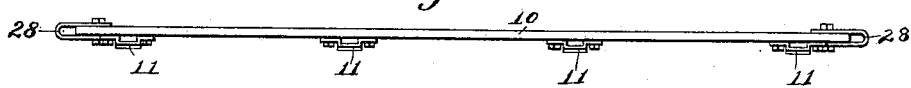

Figure 1 is a plan view of my improved vehicle. Fig. 2 is a side elevation thereof. Fig. 3 is an end elevation. Fig. 4 is a plan view of a vehicle lengthened in accordance with my invention. Figs. 5, 6, and 7 are vertical transverse sectional views on the planes indicated by the lines *x x*, *y y*, and *z z* of Fig. 2, respectively. Figs. 8 and 9 are detached views in side elevation and plan, respectively, of one of the inclined side-boards of the wagon-body. Fig. 10 is a plan view of the longitudinal sills, the cross-pieces, the inclined stakes which constitute the frame of the body of the wagon, and the detachable extensible frame. Figs. 11 and 12 are detail views in side elevation of a modified form of the side piece and end-gate of the body, and Figs. 13 and 14 are like views of corresponding parts of another modification.

Like numerals of reference denote corresponding parts in all the figures of the drawings, referring to which—

1 2 designate the longitudinal sills of my improved vehicle or wagon body, which are arranged parallel with each other, and 3 4 the end pieces, which are secured to the ends of said longitudinal sills. These sills are further provided at intermediate points of their length with mortises, in which are fitted the ends of a series of cross-pieces 5. Each cross-piece of the series is provided with two diagonal apertures 6, which are inclined in opposite directions, and in these apertures of each cross-piece are fitted the lower extremities of inclined stakes 7 8, on which are built or made up the sides of the wagon-body. Each stake is provided in its opposite sides with grooves or channels, in which are fitted the ends of a series of vertical boards 9, which extend from one stake to the adjoining stake, and on the upper edges of the series of vertical boards on each side of the body rests the lower edge of a single inclined side-board 10, which extends continuously from end to end of the body. The upper ends of the inclined stakes are arranged exteriorly of the single continuous inclined side-board, which thus rests on the stakes on one side of the body and has its lower edge terminating flush with the inner face of the vertical boards 9, and said board 10 is secured in place on the stakes by means of clips 11, which are bolted to the outer face of each side of the stakes, and thus securely holds the board 10 in place, while at the same time it can be readily removed. Each inclined side-board 10 is further provided at intermediate points of its length and at a suitable distance from its lower edge, so as to preserve the strength of the board and prevent it from splitting, with transverse apertures 12, through which pass the upper extremities of the vertical bars 13, which are secured to the base-sills 14 of the ordinary running-gear of a farm-wagon.

The series of vertical boards 9 and the inclined continuous board 10 form one side of the wagon-body, which in cross-section is flaring at its upper portion, and the bottom of the body is composed of three or more flat longitudinal boards 15, which extend continuously from end to end of the body and are imperforate, except as to the apertures provided through the two side-boards of said bottom for the passage of the inclined stakes.

At one end of the body in Fig. 4 I provide an adjustable rack 16 and at the opposite end a folding ladder 17, each of which is carried by or fixed to a pivot-bar 18, which is arranged or located above the bottom of the body and provided at its ends with trunnions or pins 19, that are journaled in eyes 20 on the upper extremities of vertical bolts 21, which are passed through apertures 22, formed in the transverse pieces 3 4. (See Fig. 10.) By arranging the pivot-bars of the rack and ladder above the bottom of the body and fitting them in the removable eyebolts I am enabled to fold the rack and ladder closely to and compactly on the bottom, as well as to readily and easily remove the said parts without detaching any other part of the body or providing any special construction of bottom boards.

25 is the end-gate, which is widened and shaped at its upper end to conform to the contour of the body in cross-section, and the side edges of this gate are protected and strengthened by metallic plates or straps 26, which are bent laterally at their upper extremities to conform to the shape of the end-gate. The lower extremities of these brace-straps are bent to form eyes, through which are passed bolts to pivotally connect the end-gate to plates 27, which are fixed or bolted to the longitudinal sills 1 2 of the body. Transversely through the end-gate and the brace-strap thereof are formed slots, through which are passed strap-loops 28 on the inclined continuous side pieces 10 of the body, each of said loops being bent of a single piece of metal to form an eye, while the free ends of the straps are pivotally connected to the side-board 10 by a single through-bolt 29. The strap-loops pass through the slots in the end-gate when the latter is closed, and it is confined in place by securing-pins 30, which are connected to the end-gate by chains, as is obvious from an inspection of Figs. 1 to 4, inclusive, of the drawings.

In Figs. 1 and 2 of the drawings I have shown a short wagon-body, which is desirable in hauling certain kinds of farm products, as, for instance, corn, &c.; but when the farmer desires to haul hay and other grains it is desirable to increase the capacity of the body, and I accordingly provide means for increasing the length of the body, substantially as indicated more clearly by reference to Figs. 4 and 10. I employ an extensible or sliding frame 30, which consists of two parallel side pieces that are fitted to slide endwise on suitable ways or in grooves 31' in the longitudinal sills 1 2 of the frame of the body, and to the outer extremities of the side bars of the extensible frame 30 is secured one of the transverse bars 3 of the frame 1 2 3 4 of the body, an additional cross-piece 5' being secured to the free ends of the sills 1 2, and an additional pair of inclined stakes 7' 8' being fitted on the cross-piece 5' in the ordinary manner. Between the inclined stakes 7 8 of the end piece 3 and the pair of stakes 7' 8' of the cross-piece 5' are fitted short additional vertical boards 9, and short bottom boards are fitted between the ends of the bottom boards and end-gate. It will be understood that I provide each wagon-body with the additional cross-piece 5', having the stakes 7' 8', the sliding extensible frame 30, and the short bottom and side boards; but another set of long boards 10' is provided, which take the place of the boards 10 of the shorter body, and which correspond in length to the longer body desired.

To change the body from a short to a longer one, the inclined side-boards 10 are removed, the sliding frame drawn out the desired length, the additional cross-piece and its inclined stakes 7' 8' adjusted in place, the additional short side and bottom boards fitted in place, and, finally, the inclined side-boards 10' are secured, thus utilizing the parts of the short body, except the inclined side-boards 10, and converting the short body into a long one.

I also contemplate providing a square body for the vehicle, which may be either solid or slatted, for the purposes of hauling either vegetables or other solid substances and small animals, such as sheep, hogs, calves, &c. In case the square body is desired for hauling a solid substance the vertical and inclined side-boards, the stakes, the end-gate, and cross-pieces are detached, and the side-boards and end-gate shown in Figs. 11 and 12 are employed. Each side-board is provided at the ends thereof with vertical straps 35, which are extended and threaded at their lower ends below the board, and these threaded straps pass through the apertures 22 in the transverse sills 3 4 and are detachably secured to the frame of the body by suitable nuts, whereby the sides are detachably secured on the frame. The end-gate is square and provided with the slots to receive the pivoted loops on the side-boards and with the straps for bracing the end-gate and forming a part of the hinge to connect the gate to the body.

If it is desired to transport small cattle or stock, a slatted end-gate and side-boards constructed as shown in Figs. 14 and 13, respectively, are employed, and these sides and end-gate are provided with devices for securing them in place of the form and construction shown in Figs. 11 and 12 and just described. Of course suitable bottom boards are provided for the body when composed of the sides and end-gate of the character shown in Figs. 11 and 12 or in Figs. 13 and 14.

The operation and advantages of my invention will be readily understood and appreciated by those skilled in the art to which it relates from the foregoing description, taken in connection with the drawings.

In order to conceal the joint between the bottom boards 15 and short bottom boards when the body of the vehicle is extended or made longer, as indicated substantially in Figs. 4 and 5, I may provide a strip or plate, preferably of metal, which is arranged over the joint and secured in place by bolts, as indicated by dotted lines in Fig. 4.

To securely connect the inclined stakes to the sill and prevent displacement of the stakes, I have provided a hook 40, which is connected by a staple to the sill 1 or 2 and fits in a staple 41 on the outer side of said inclined stake.

The stake itself is provided with a shoulder 42, which fits against the cross-piece and sill 1 or 2 of the body to prevent downward play of the stake, which is held against upward displacement by the hook or fastening device.

I would have it understood that I do not restrict myself to the form and proportion of parts herein shown and described, nor to a body having the number of cross-sills and inclined stakes as shown herein, as I am aware that the number of parts, as well as the relative size and proportions thereof, can be varied without departing from the spirit or sacrificing the advantages of my invention.

Having thus fully described my invention, what I claim as new, and desire to secure by Letters Patent, is—

1. A wagon-body consisting of the longitudinal and transverse sills, the bottom, the sides, the vertical threaded eyebolts passing through the sills and bottom, and a pivot-bar arranged above the bottom, fitted in said eyebolts, and carrying a rack or ladder, substantially as and for the purpose described.

2. The combination of the longitudinal sills, an extensible frame arranged in the same horizontal plane as said sills and adjustable longitudinally thereon in line with the same to vary the length of the foundation-frame for the body of the vehicle, the transverse sills, one of which is fixed to the extensible frame, the cross-piece, the inclined stakes fitted in the cross-pieces on the longitudinal sills and extensible frame, and the bottom and side boards, substantially as and for the purpose described.

3. A wagon-body consisting of the longitudinal sills, an extensible frame having its sides fitted between and supported on the rear ends of said longitudinal sills, said extensible frame being adjustable bodily on the sills in the direction of its length to extend or shorten the length of the foundation-frame for the vehicle-body, the transverse sills secured to the longitudinal sills and the extensible frame, the cross-pieces secured in the sills, the fixed inclined stakes, the vertical sectional side-boards, the continuous inclined side-boards, and an end-gate, substantially as described.

4. A wagon-body having the inclined side-boards, the strap-loops, each secured by a single pivot-bolt to one of the sides and projecting longitudinally therefrom beyond the rear edge of the same, and a hinged end-gate having the fixed straps which extend from edge to edge thereof, and provided with the transverse slots through which the strap-loops are adapted to pass when said end-gate is closed, substantially as described.

In testimony whereof I affix my signature in presence of two witnesses.

FELIX G. McCLELLAN.

Witnesses:
T. B. CARSON,
A. H. SCHWEMLEY.